Sept. 25, 1956 R. A. FINDLAY 2,764,620
ADSORPTION PROCESS WITH HEATING IN DOWNSTREAM
END OF ADSORPTION COLUMN TO SELECTIVELY
REMOVE OCCLUDED LIQUIDS
Filed Dec. 4, 1951
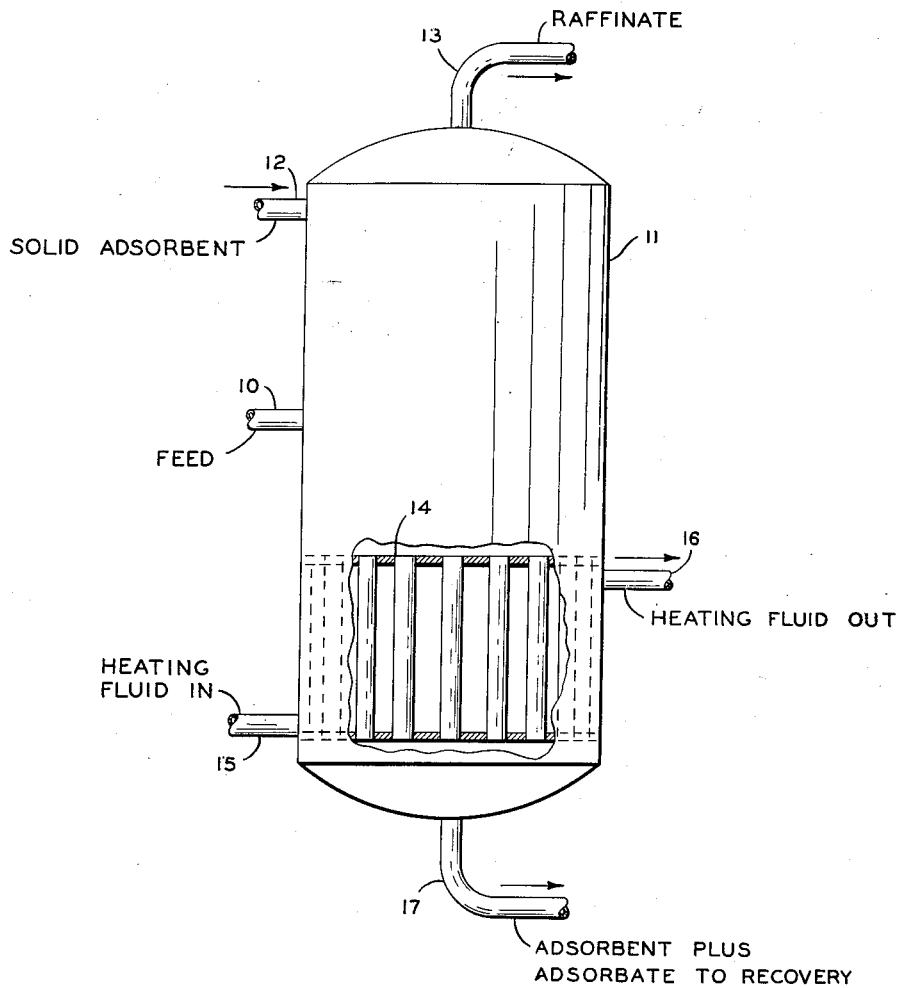
INVENTOR.
R. A. FINDLAY
BY
Hudson & Young
ATTORNEYS

United States Patent Office 2,764,620
Patented Sept. 25, 1956

2,764,620

ADSORPTION PROCESS WITH HEATING IN DOWNSTREAM END OF ADSORPTION COLUMN TO SELECTIVELY REMOVE OCCLUDED LIQUIDS

Robert A. Findlay, Bartlesville, Okla., assignor to Phillips Petroleum Company, a corporation of Delaware Application December 4, 1951, Serial No. 259,747

10 Claims. (Cl. 260—674)

This invention relates to the separation of materials having varying adsorbabilities. In one of its aspects this invention is directed to a process for the separation of materials having different adsorbabilities whereby it is possible to recover a substantially pure material as adsorbate. In another of its aspects this invention relates to the separation of hydrocarbons according to chemical type by selective adsorption and especially concerns the separation of aromatics from other hydrocarbons. This invention has utility in the preparation of a concentrate of particular selected materials. For instance in the application of this invention to the separation of hydrocarbons, it is possible to separate and recover a blending material of high antiknock quality and suitable for use in an aviation gasoline. In a specific application the invention is useful for the treatment of hydrocarbon mixtures derived from petroleum, coal, lignite, shale oil, pitches, tars and the like to recover therefrom a particular, desired fraction.

Concerning the application of this invention to the separation of a complex hydrocarbon mixture such as a gasoline and/or kerosene fraction derived from petroleum it is well known that a separation of these materials can be made according to chemical type by selective adsorption on certain solid granular adsorbent materials. Silica gel is recognized as an efficient adsorbent to effect such separations. Furthermore, it is well known that the adsorptive affinity of silica gel and like adsorbents for the various constituents of a mixture of materials varies with the chemical type of the materials therein and generally in the following decreasing order:

(1) Polar compounds, for instance, hydroxy compounds such as phenols and alcohols, as well as other polar compounds such as ketones, aldehydes, ethers, acids and their various substituted derivatives as well as the corresponding sulfur, phosphorus and nitrogen compounds and analogues.

(2) Aromatic compounds.
(3) Olefinic compounds.
(4) Naphthenic compounds.
(5) Paraffinic compounds.

Considering the applicability of this invention for the separation of hydrocarbon mixtures such as a gasoline or a kerosene fraction, it is well known that aromatic hydrocarbons are the most readily adsorbed therefrom and methods of effecting the separation of the aromatic hydrocarbons therefrom based on selectivity adsorption are well known in the art. In general, these methods comprise contacting a suitable hydrocarbon fraction to be treated or fractionated, such as a gasoline or kerosene fraction, with silica gel, as by percolation filtration, to adsorb the aromatic hydrocarbons, followed by a desorption step wherein the adsorbent together with its adsorbate is contacted with a material which is more strongly adsorbed, for instance a polar material such as methanol, acetone or water, and which serves to displace the adsorbed aromatics from the adsorbent. The aromatic hydrocarbons are removed from the gel in admixture with an excess of desorbing agent, and may be recovered therefrom by distillation, solvent extraction, phase separation or the like. These known methods for recovering a selected fraction from an admixture of materials have, however, not been proved to be practical for large scale operation due to certain inherent disadvantages.

One inherent major disadvantage in the heretofore known methods, especially when applied to the separation and recovery of a relatively pure fraction, is that the selective adsorbent after contacting contains a substantial amount of the liquid ambient phase occluded thereon. This occluded liquid ambient phase usually has substantially the same composition as the original mixture treated. Accordingly, as a result when the adsorbent is treated for the recovery of the adsorbate therefrom, there is recovered also the occluded liquid ambient phase which contains associated therewith various other materials which are not desired to be recovered with the particular desired fraction. One method employed in the prior art to overcome this deficiency has been to employ a liquid reflux of the adsorbate. That is, after the solid adsorbent has been removed from the mixture to be separated, adsorbate is recovered therefrom and a portion thereof recycled to the first contacting step as reflux to displace the occluded liquid ambient phase from the adsorbent. This method, however, has an inherent disadvantage in that the recycled adsorbate must then be re-adsorbed, thus requiring additional amounts of adsorbent and increasing the size of the equipment required to process a given volume of feed. Furthermore the output per unit time of the equipment employed is reduced.

It is an object of this invention, therefore, to provide an improved method for the separation of materials of varying adsorbability by means of a selective adsorbent. It is another object of this invention to provide a method for the continuous liquid phase adsorption of a mixture of materials wherein it is possible to recover a substantially pure selected fraction as adsorbate. It is still another object of this invention to provide a method suitable for use in a continuous liquid-phase adsorption of a mixture of materials having varying adsorbabilities by a proces wherein the liquid ambient phase occluded on the solid selective adsorbent is substantially completely displaced by adsorbate. Another object is to substantially reduce or completely eliminate the amount of adsorbate recycled to the adsorption zone as reflux usually required to obtain a pure product. These and other objects of this invention and how they are achieved will become apparent and be better understood from a consideration of the following disclosure.

In accordance with the present invention it has now been discovered that the liquid ambient phase occluded on a solid selective adsorbent employed in a selective adsorption process for the separation of a liquid mixture of materials of varying adsorbabilities, can be displaced by increasing the temperature of said solid selective adsorbent. More particularly, it has now been discovered that in a continuous adsorption process substantially pure adsorbate free from undesirable liquid impurities, can be recovered in a process which comprises contacting, preferably countercurrently, a liquid mixture of materials to be separated with a solid selective adsorbent in a contacting zone and increasing the temperature of the resulting, contacted solid adsorbent (containing as adsorbate the desired fraction to be recovered) whereby at least a portion of the adsorbate is desorbed from the solid adsorbent and displaces the liquid ambient phase occluded on the selective adsorbent. The temperature to which the adsorbent is heated should be such that the adsorptive capacity of the selected solid adsorbent is reduced. In general, this temperature increase is usually between about 10° and 150° F. or greater depending upon the mixture to be separated and the purity of the recovered adsorbate desired, as well as upon the character and type of solid selective adsorbent employed.

The solid selective adsorbent which may be employed in the practice of this invention includes any of the well known solid selective adsorbents such as activated charcoal, silica gel, activated clay, alumina, zeolite, and the like. In general, those solid materials which display selective adsorptive properties for various liquid materials or fractions can be employed in the process of this invention. Silica gel is particularly preferred because of its wide range of selective adsorptive power or affinity for the various chemical compounds. An activated charcoal such as coconut shell charcoal and birch bark charcoal, is also useful and preferred.

The process of this invention as indicated hereinabove is particularly useful for the recovery of aromatic hydrocarbons from a petroleum fraction containing the same. A typical application of the process of this invention with reference to the recovery of aromatic hydrocarbons is described immediately hereinbelow. An aromatic hydrocarbon-containing charge stock such as a straight-run gasoline fraction and containing a minor amount of aromatic hydrocarbons, such as between 2 and 25 per cent by volume aromatic hydrocarbons is countercurrently continuously contacted with granulated silica gel in a contacting zone. From one end of the contacting zone a liquid raffinate phase having a substantially reduced aromatic hydrocarbon content is removed. At the other end of the contacting zone, silica gel containing at least a portion of the aromatic hydrocarbon adsorbed thereon as adsorbate and while still in contact with the ambient liquid phase of the mixture to be separated is heated to a temperature greater than the temperature at which the silica gel was initially contacted with the hydrocarbon mixture containing the aromatic hydrocarbons. As a result of the increase in temperature, a portion of the liquid aromatic hydrocarbons which are adsorbed on the silica gel are desorbed. The desorbed liquid aromatic hydrocarbons act as a liquid reflux and displace the occluded liquid ambient phase. After this heating and displacement occurs the silica gel is removed from the contacting zone. The solid adsorbent removed therefrom now contains substantially only aromatic hydrocarbons adsorbed thereon as adsorbate, the occluded liquid ambient phase containing non-aromatic hydrocarbons having been displaced. The silica gel may now be processed in any suitable manner for the recovery of substantially pure aromatic hydrocarbons therefrom.

The following example is illustrative of the invention and is given merely as an illustration and is not to be considered limitative thereof.

EXAMPLE

Three adsorptive separations were carried out in a 24 inch long by 22-mm. diameter jacketed column. Approximately 100 gms. granulated silica gel were used in each test. After the silica gel had been compacted, 200 ml. of a benzene-heptane mixture (33.9 wt. per cent benzene) was admitted to the top of the column, the temperature of the column being maintained at 90° F. In tests numbers 1 and 2 the column was drained until the flow of liquid hydrocarbon from the column had stopped. Hot water at a temperature of 150° F. was then passed through the jacket until the entire silica gel bed was at a temperature of about 150° F. The liquid hydrocarbon released by the gel was drained from the column and its volume and refractive index measured. In test number 3, a different procedure was employed. After the passage of a considerable amount of the hydrocarbon mixture through a fresh bed of silica gel, the stop cock at the bottom of the column was closed with a liquid level in the column coinciding with the top surface of the silica gel. The column was then heated to 150° F. and the increase in the liquid level measured. The conditions and results of these tests as set forth in Table Number I below indicate that at least a portion of the reflux needed in a continuous adsorptive separation operation can be obtained by heating the adsorbent to drive off at least a portion of the adsorbate.

*Table Number I.—Selective adsorbent recovery of benzene employing adsorbate as direct liquid reflux*

Weight of silica gel=100 grams (fresh gel used in each test)
Size of silica gel=28–200 mesh
Volume of benzene-heptane feed=250 ml.
Composition of feed=33.9 weight percent benzene
Density of feed=0.7488
Benzone in feed=63.5 grams

| Test No. | Drained from Column at 90° F. | | Additional Drainage from Column at 150° F. | |
|---|---|---|---|---|
| | Vol. in ml. | Wt. Percent Benzene | Vol. in ml. | Wt. Percent Benzene |
| 1 | 168 | 21 | 14 | 32.4 |
| 2 | 177 | 21 | 9 | 31.7 |
| 3 | 168 | 21.8 | ¹6 | ---------- |

¹ This is the volume equivalent to the change in hydrocarbon level in the column.

Based on Test No. 1, the following conclusions can be drawn from the above data: Of the 63.5 g. of benzene in the feed, 25.5 g. were drained from the gel at 90° F., leaving 38.0 g. of benzene in the column (adsorbed phase plus occluded liquid). Of the 123.7 g. of heptane in the feed 95.7 g. were drained at 90° F., leaving 27.8 g. of heptane in the column. The material left in the column, then (38.0 g. plus 27.8 g.) has a composition of 57.75 wt. per cent benzene and 42.25 wt. per cent heptane. After the column had been heated to 150° F. the liquid drained therefrom consisted of 32.4 wt. per cent benzene and 67.6 wt. per cent heptane, thus showing that the effect of heating is to cause heptane to be selectively desorbed, i. e. to leave the material which is still in contact with or adsorbed on the gel richer in benzene. Thus, after the 14 ml. of liquid comprising 32.4 wt. per cent benzene had been drained from the column at 150° F., the liquid then remaining in the column consisted of 34.6 g. of benzene and 20.7 g. of heptane. Recovery of this material by conventional desorption yields a product comprising 62.5 wt. per cent benzene as compared with a feed of 33.9 wt. per cent benzene.

The foregoing data demonstrates that heating the gel in accordance with the invention results in increasing the purity of the aromatic product ultimately recovered. Obviously, the purity of the product can be increased still further by employing an increased number of contacting stages, as by continuous countercurrent contacting, or by heating the adsorbant plus adsorbate within the contacting zone to higher temperatures and/or the use of some recycled product as reflux.

This invention will be more specifically described with reference to the accompanying drawing wherein is presented a schematic representation in elevation of one process adapted to the practice of this invention and in which a liquid mixture of materials having varying adsorbabilities is fractionated according to the process of this invention to separate therefrom a selected fraction.

Referring now to the accompanying drawing, a hydrocarbon mixture such as a straight run gasoline fraction containing aromatic hydrocarbons is admitted via line 10 intermediate contacting zone 11. Solid granular adsorbent is admitted via line 12 into one end of the contacting zone. The solid adsorbent moves (gravitates) downwardly, countercurrently to the liquid gasoline fraction to be separated. From the top of the contacting zone a liquid raffinate phase having a substantially reduced aromatic hydrocarbon content is removed via line 13. As the solid granular adsorbent moves downwardly within the contacting zone it enters the lower section of the contacting zone. In the lower section of the contacting zone the solid adsorbent is heated to an elevated temperature. As a result of the increased temperature the liquid materials, such as the aromatic hydrocarbons which were selectively adsorbed on the solid adsorbent, are at least partially desorbed. The resulting desorbed liquid materials (aromatic hydrocarbons) act as a reflux and effectively displace and/or wash at least a portion of the occluded liquid ambient phase from the solid adsorbent. This increase in temperature of the solid adsorbent is accomplished by heat exchange means 14 which is supplied with a suitable heat transfer fluid via line 15 and from which it emerges via line 16. From the bottom of the contacting zone solid adsorbent containing selectively adsorbed material thereon as adsorbate is removed via line 17. The absorbent together with adsorbate may then be transferred and processed to recover therefrom a hydrocarbon fraction having a substantially increased aromatic hydrocarbon content or substantially pure aromatic hydrocarbons. The solid adsorbent after removal of the adsorbate by any preferred method and after regeneration can then be recycled to the above indicated operation for separation of additional aromatic hydrocarbons.

In carrying out the process of this invention, it is preferred to carry out the contacting or selective adsorption step at about room temperature, i. e., within the range 70–100° F. It is, of course, realized that higher or lower temperatures may be employed depending upon the character and type of materials to be separated. In the lower section of the contacting zone, it is preferred to heat the solid adsorbent to a temperature in the range 100–200° F. when the contacting zone is operated at about room temperature. In general, the temperature in the lower section of the contacting zone should be such that the adsorptive capacity of the solid adsorbent is reduced. A suitable temperature differential between the adsorbent in the lower section of the contacting zone and the main body of the adsorbent in the contacting zone is in the range 5–200° F. It is, of course, realized that the temperature differential may be more or less than indicated above depending upon the type and character of the materials to be separated and the purity of the material desired to be recovered as adsorbate.

In certain instances, it is advantageous to supplement or provide the internal reflux, by directly heating the adsorbent in the lower portion of the contacting bed with a hot reflux stream consisting of a portion of the adsorbate product recovered from the solid adsorbent. In some operations this could obviate the need for an internal heat exchanger. It is preferred to heat the recycled product (reflux) stream to a temperature approximating that to which the gel is heated in the reflux zone before introducing this stream into the contacting column. In some instances as pointed out hereinabove this reflux stream may be externally heated to a temperature substantially higher than that desired in the reflux zone, thereby supplementing or even replacing the heating of the gel and liquid contents of the reflux zone by indirect means.

In any case the various modifications described hereinabove are believed to be clearly within the scope of the invention, one aspect of which is in the discovery that all or a substantial portion of the reflux required, in a selective adsorption process for the separation of liquids of differing adsorbabilities, can be provided by raising the temperature of the reflux zone, relative to the temperature of the adsorption zone.

As will be evident to those skilled in the art, upon reading this disclosure many substitutions, alterations and changes may be made without departing from the spirit or scope of this invention.

I claim:

1. A process for the fractionation of a liquid mixture of materials of varying adsorbabilities which comprises introducing said liquid mixture into an intermediate section of a contacting zone; countercurrently contacting said liquid mixture in said contacting zone with a solid adsorbent material which displays selective adsorptive properties for liquid materials and which is introduced into said zone at a point upstream, with respect to adsorbent flow, of the point of liquid mixture introduction so as to obtain a solid adsorbent material containing certain of the materials of said liquid mixture selectively adsorbed thereon together with said liquid mixture of materials occluded thereon; heating the resulting contacted solid adsorbent material while still containing said adsorbed materials and said occluded liquid mixture in the downstream end of said contacting zone to a temperature between 5° F. and 200° F. higher than that at which the contacting initially took place but below the boiling point of said occluded mixture so as to desorb a portion of said adsorbed materials; and withdrawing the resulting heated solid adsorbent material substantially free of said occluded liquid mixture from said end of said contacting zone; and withdrawing a liquid raffinate phase from the other end of said contacting zone.

2. A process according to claim 1 wherein the solid adsorbent is an alumina gel.

3. A process according to claim 1 wherein the solid adsorbent is a zeolite.

4. A process according to claim 1 wherein the solid adsorbent is a clay.

5. A process according to claim 1 wherein the solid adsorbent is silica gel.

6. A process for recovering liquid aromatic hydrocarbons from a liquid admixture with non-aromatic hydrocarbons which comprises introducing said liquid admixture into an intermediate section of a contacting zone; countercurrently contacting said admixture in said contacting zone with a solid particulate selective adsorbent for aromatic hydrocarbons so as to obtain a solid adsorbent containing aromatic hydrocarbons adsorbed thereon together with said liquid admixture occluded thereon, said solid adsorbent being introduced into said zone at a point upstream, with respect to adsorbent flow, of the point of liquid admixture introduction; heating the resulting contacted solid adsorbent while still containing said adsorbed aromatic hydrocarbons and said occluded liquid admixture in the downstream end of said contacting zone to a temperature between 5° F. and 200° F. higher than that at which the contacting initially took place but below the boiling point of said occluded liquid admixture so as to desorb a portion of the adsorbed aromatic hydrocarbons and cause displacement of occluded liquid mixture; and recovering from the resulting heated solid adsorbent substantially free of occluded liquid admixture the aromatic hydrocarbons adsorbed thereon.

7. A process according to claim 6 wherein the solid adsorbent is an activated charcoal.

8. A process for the fractionation of a liquid mixture of liquid materials having varying adsorbabilities which comprises introducing said liquid mixture into an intermediate portion of a contacting zone; countercurrently contacting said mixture within said contacting zone with solid particulate adsorbent which displays selective adsorptive properties for liquid materials and which is introduced into said zone at a point upstream, with respect to adsorbent flow, of the point of liquid mixture introduction so as to obtain a solid adsorbent containing certain of the materials of said liquid mixture selectively adsorbed thereon together with said liquid mixture of materials occluded thereon; removing a liquid raffinate phase from the upstream end of said contacting zone;

heating the resulting contacted solid adsorbent while still containing said adsorbed materials and said occluded liquid mixture in the downstream end of said contacting zone to a temperature between 5° F. and 200° F. higher than that at which the contacting initially took place but below the boiling point of said occluded mixture so as to desorb a portion of said adsorbed materials and cause displacement of occluded liquid mixture; and withdrawing from said downstream end of said contacting zone the resulting heated solid adsorbent containing certain of said materials selectively adsorbed thereon and substantially free of said occluded liquid mixture.

9. A process according to claim 8 wherein the solid particulate selective adsorbent is silica gel.

10. A process for the fractionation of a liquid mixture of materials having varying adsorbabilities which comprises introducing a solid selective adsorbent selected from the group consisting of activated charcoal, silica gel, activated clay, alumina and zeolite into the upper end of a contacting zone; gravitating said solid adsorbent through said contacting zone; introducing said liquid mixture into an intermediate portion of said contacting zone so as to contact countercurrently said gravitating solid adsorbent at temperature between 70° F. and 100° F. and obtain a solid adsorbent containing certain of the materials of said liquid mixture selectively adsorbed thereon together with said liquid mixture of materials occluded thereon; removing a liquid raffinate phase from the upper end of said contacting zone; passing a heat transfer fluid into the lower portion of said contacting zone in indirect heat exchange relation with said solid adsorbent while still containing said adsorbed materials and said occluded liquid mixture; heating said solid adsorbent in said indirect heat exchange relation to a temperature in the range of 5° F. and 200° F. higher than that at which the contact initially took place but below the boiling point of said occluded liquid mixture, thereby desorbing at least a portion of said adsorbed materials and causing displacement of occluded liquid mixture; and removing from the lower portion of said contacting zone solid adsorbent containing certain of said materials selectively adsorbed thereon and substantially free of said occluded liquid mixture.

References Cited in the file of this patent

UNITED STATES PATENTS

| | | |
|---|---|---|
| 2,395,491 | Mavity | Feb. 26, 1946 |
| 2,425,535 | Hibshman | Aug. 17, 1947 |
| 2,566,613 | Hepp | Sept. 4, 1951 |
| 2,571,936 | Patterson et al. | Oct. 16, 1951 |
| 2,631,727 | Cichelli | Mar. 17, 1953 |